United States Patent
Lammi et al.

(10) Patent No.: US 9,567,251 B2
(45) Date of Patent: Feb. 14, 2017

(54) METHOD FOR HEATING GLASS SHEETS, AND GLASS TEMPERING FURNACE

(71) Applicant: TAIFIN GLASS MACHINERY OY, Tampere (FI)

(72) Inventors: Petri Juhani Lammi, Kyröskoski (FI); Esa Ensio Lammi, Tampere (FI); Jarno Tapio Nieminen, Kyröskoski (FI); Jukka Tapani Sääksi, Nokia (FI)

(73) Assignee: TAIFIN GLASS MACHINERY OY, Tampere (FI)

( * ) Notice: Subject to any disclaimer, the term of this patent is extended or adjusted under 35 U.S.C. 154(b) by 0 days.

(21) Appl. No.: 14/283,872

(22) Filed: May 21, 2014

(65) Prior Publication Data
US 2014/0345330 A1    Nov. 27, 2014

(30) Foreign Application Priority Data

May 23, 2013    (FI) ..................................... 20135553

(51) Int. Cl.
*C03B 27/04*    (2006.01)
*C03B 29/08*    (2006.01)

(52) U.S. Cl.
CPC ........... *C03B 27/0404* (2013.01); *C03B 29/08* (2013.01)

(58) Field of Classification Search
CPC ...... C03B 29/08; C03B 27/04; C03B 27/0404; C03B 27/0413; C03B 27/0417; C03B 27/044
See application file for complete search history.

(56) References Cited

U.S. PATENT DOCUMENTS

| | | | | |
|---|---|---|---|---|
| 3,332,759 A | * | 7/1967 | McMaster | C03B 23/035 165/120 |
| 3,393,062 A | * | 7/1968 | Hesten | C03B 27/0404 65/104 |
| 4,119,426 A | * | 10/1978 | Kelly | C03B 29/10 65/104 |
| 4,200,446 A | * | 4/1980 | Koontz | C21D 9/63 65/167 |

(Continued)

FOREIGN PATENT DOCUMENTS

| EP | 0659697 A2 | 6/1995 |
|---|---|---|
| EP | 0 937 687 A2 | 8/1999 |

(Continued)

OTHER PUBLICATIONS

Oct. 15, 2014 Extended European Search issued in Application No. 14168954.7.

*Primary Examiner* — Jodi C Franklin
(74) *Attorney, Agent, or Firm* — Oliff PLC

(57) ABSTRACT

The invention relates to a method for heating glass sheets, and a glass tempering furnace. The glass sheets are heated by feeding them through a tempering furnace whereby the glass sheets are heated from above and below in the tempering furnace. The glass sheets are heated with blowing channels arranged substantially transverse in relation to the direction of travel of the glass sheets and with heating resistor rows arranged substantially transverse in relation to the direction of travel of the glass sheets. A heating resistor row has at least three separately controllable parts, and the temperature profile of the glass sheet is adjusted in the transverse direction by separately adjusting the different parts of the resistor row.

16 Claims, 3 Drawing Sheets

(56) References Cited

U.S. PATENT DOCUMENTS

| | | | | |
|---|---|---|---|---|
| 4,824,464 A | * | 4/1989 | Perin | C03B 29/08 65/106 |
| 4,871,385 A | * | 10/1989 | Lecourt | C03B 27/0404 65/103 |
| 4,952,227 A | * | 8/1990 | Herrington | C03B 23/0302 65/162 |
| 5,122,180 A | * | 6/1992 | Mathivat | C03B 29/08 432/122 |
| 5,173,102 A | * | 12/1992 | Weber | C03B 23/0258 65/162 |
| 5,470,367 A | * | 11/1995 | Salonen | C03B 29/08 219/480 |
| 5,647,882 A | * | 7/1997 | Thiessen | C03B 25/08 34/635 |
| 6,045,358 A | * | 4/2000 | Kormanyos | C03B 29/08 432/136 |
| 6,064,040 A | * | 5/2000 | Muller | C03B 27/012 219/388 |
| 6,092,393 A | | 7/2000 | Mathivat et al. | |
| 6,776,008 B1 | * | 8/2004 | Vehmas | C03B 27/044 65/114 |
| 7,178,367 B2 | * | 2/2007 | Honjo | C03B 23/0254 65/182.2 |
| 7,216,511 B2 | | 5/2007 | Haws et al. | |
| 7,320,187 B2 | * | 1/2008 | Bancon | C03B 25/08 34/620 |
| 8,322,162 B2 | * | 12/2012 | Janhunen | C03B 29/08 219/400 |
| 2003/0061834 A1 | * | 4/2003 | Vitkala | C03B 29/08 65/111 |
| 2004/0261457 A1 | * | 12/2004 | Vehmas | C03B 29/08 65/29.19 |
| 2006/0207292 A1 | | 9/2006 | Jarvinen et al. | |
| 2006/0248924 A1 | * | 11/2006 | Janhunen | C03B 29/08 65/114 |
| 2010/0031703 A1 | * | 2/2010 | Lammi | C03B 29/08 65/181 |
| 2010/0251773 A1 | * | 10/2010 | Vehmas | C03B 27/0417 65/104 |
| 2011/0167871 A1 | * | 7/2011 | Vehmas | C03B 23/035 65/25.2 |
| 2011/0219822 A1 | * | 9/2011 | Anttonen | C03B 29/08 65/355 |
| 2011/0277506 A1 | * | 11/2011 | Lewandowski | C03B 23/0302 65/90 |
| 2014/0345330 A1 | * | 11/2014 | Lammi | C03B 27/0404 65/114 |

FOREIGN PATENT DOCUMENTS

| | | |
|---|---|---|
| FI | 20030482 A | 10/2004 |
| FI | 120972 B | 5/2010 |
| JP | 4400158 B2 | 1/2010 |
| WO | WO 2008/071833 A1 | 6/2008 |
| WO | 2009/101648 A1 | 8/2009 |

* cited by examiner

METHOD FOR HEATING GLASS SHEETS, AND GLASS TEMPERING FURNACE

BACKGROUND OF THE INVENTION

The invention relates to a method for heating glass sheets, and a glass tempering furnace.

When glass sheets are heated in a glass tempering furnace, the aim is to heat them as evenly as possible. Any unevenness in the temperature will result in tensions and consequently optical errors in the glass. To establish as even as possible a thermal effect, the aim is to adjust the temperature profile of the glass sheet in a diversified way.

BRIEF DESCRIPTION OF THE INVENTION

It is an object of the present invention to provide a new type of solution for heating glass sheets and a new type of glass tempering furnace.

The solution of the invention is characterized by what is disclosed in the independent claims. Some embodiments of the solution are disclosed in the dependent claims.

In the solution put forth, glass sheets are heated by feeding them through a tempering furnace whereby the glass sheets are heated from above and below in the tempering furnace. The glass sheets are heated with blowing channels arranged substantially transverse in relation to the direction of travel of the glass sheets and with heating resistor rows arranged substantially transverse in relation to the direction of travel of the glass sheets. A heating resistor row has at least three separately controllable parts, and the temperature profile of the glass sheet is adjusted in the transverse direction by separately adjusting the different parts of the resistor row. With such a solution, it is possible to avoid spots of discontinuity in heating the glass, which are typically formed, for example, between blowing channels arranged longitudinally in the direction of travel of the glass sheets. So, with the aid of substantially transverse blowing channels, these gaps may be avoided in a simple way. By also arranging the heating resistor row substantially transverse in relation to the direction of travel of the glass sheets, the structure of the tempering furnace can be made simple and reliable. In case the heating resistor row has at least three separately controllable parts, adequate temperature profiling in the transverse direction can be established on the glass sheet in a simple manner. Therefore, the glass sheets may be heated in a simple and reliable manner and so that the glass sheet is heated evenly. So, the tempered glass sheets exhibit very good optical characteristics, for example. A further advantage is that the glass sheets remain straight and their breaking inside the tempering furnace can be avoided. The solution is very well suited also to low-emission glasses and consequently to all glass types to be tempered.

BRIEF DESCRIPTION OF THE DRAWINGS

The invention will now be described in greater detail by means of preferred embodiments and with reference to the attached drawings, in which.

For the sake of clarity, the figures show some embodiments in a simplified manner. In the figures, like reference numerals identify like elements.

DETAILED DESCRIPTION OF THE INVENTION

Figure 1:
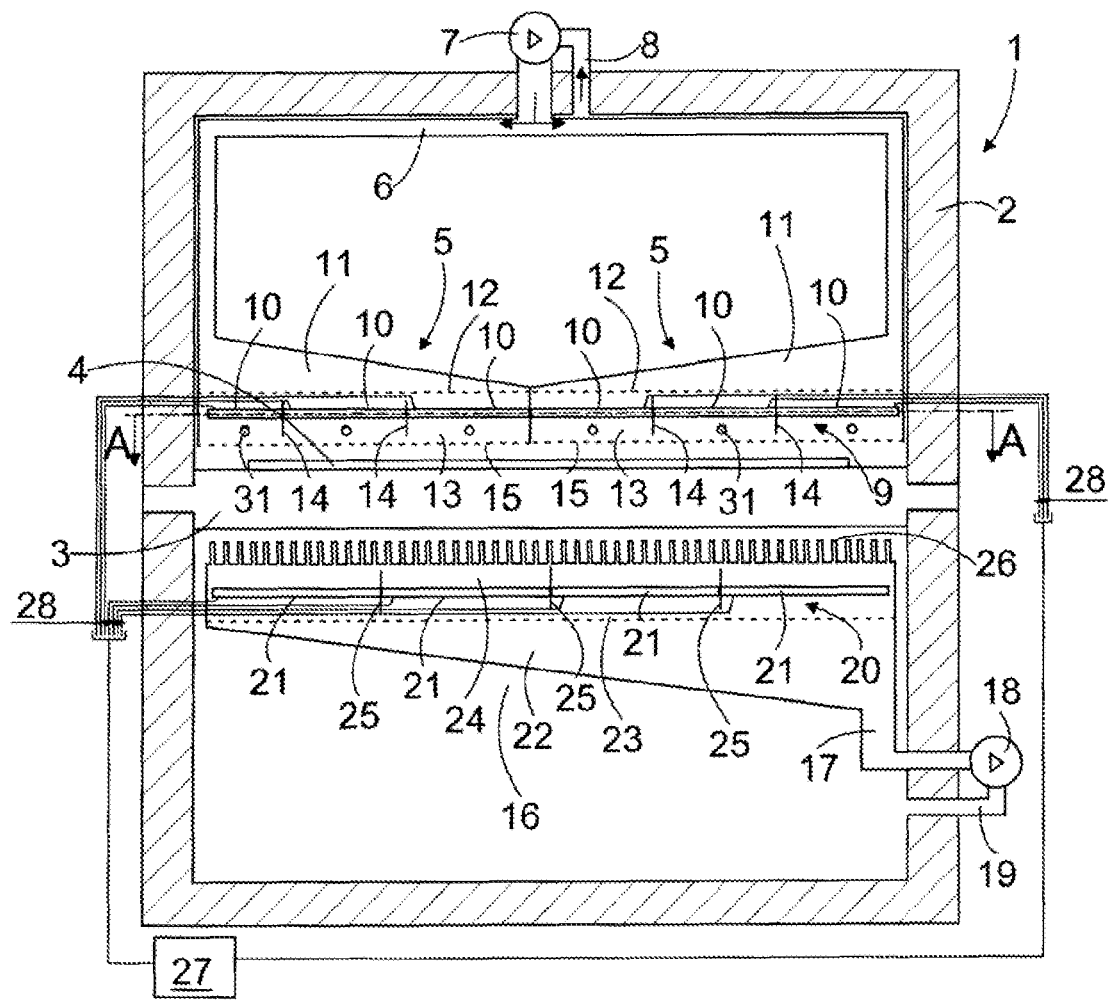
FIG. 1 is a schematic cross-sectional view of a glass tempering furnace as seen from the direction of travel of the glass sheets.

FIG. 1 is a schematic cross-sectional end view of a glass tempering furnace 1. The tempering furnace 1 has a body 2 and rolls 3 in connection with it. Typically, the rolls 3 are ceramic rolls, forming a conveyor on which the glass sheets 4 are conveyed to the tempering furnace 1 and out of it. During heating, the glass sheets 4 are oscillated by the conveyor back and forth. For reasons of clarity, the accompanying drawings do not show the means for rotating, driving, and controlling the rolls 3. The means in question are known for a person skilled in the art. Instead of the conveyor formed by the rolls 3, also another solution for conveying the glass sheets 4 may be used.

The tempering furnace further has top blowing channels 5, used to blow warm or hot air on the top surface of the glass sheet 4 to heat it. The top blowing channels 5 are arranged substantially transverse in relation to the direction of travel of the glass sheets 4. In this context, the definition substantially transverse means in an embodiment that the top blowing channels 5 are at a 70-110 degree angle with respect to the direction of travel of the glass sheets 4. The idea of another embodiment is that, the blowing channels 5 are at an 80-100 degree angle with respect to the direction of travel of the glass sheets 4. According to yet another embodiment, the blowing channels 5 are at an 85-95 degree angle with respect to the direction of travel of the glass sheets 4.

Air is fed to the blowing channel 5 through a feeding channel 6. The tempering furnace 1 further has a blower 7 by means of which air is fed to the feeding channel 6. From the top part of the tempering furnace 1, the air is fed back to the blower 7 through a return channel 8.

The tempering furnace 1 further has heating resistor rows 9, which are also arranged substantially transverse in relation to the direction of travel of the glass sheets. In this case, too, the definition substantially transverse in relation to the direction of travel of the glass sheets means that in an embodiment the heating resistor row 9 is at a 70-110 degree angle with respect to the direction of travel of the glass sheets. According to an embodiment, the heating resistor row 9 is at an 80-100 degree angle with respect to the direction of travel of the glass sheets, and according to yet another embodiment the heating resistor row 9 is at an 85-95 degree angle with respect to the direction of travel of the glass sheets 4.

The blowing channels 5 and the heating resistor rows 9 may be mutually parallel. Typically, this takes place in such a case where the heating resistor rows 9 are arranged inside the blowing channels 5 to heat the air that is blown. This is exactly the embodiment shown in FIGS. 1 and 2. It is, however, possible to arrange the heating resistor rows 9 and the blowing channels 5 is slightly differing directions, as long as both of them are arranged substantially transverse in relation to the direction of travel of the glass sheets 4.

The heating resistor row 9 comprises several separately controllable parts 10. The separately-controllable part 10 of the heating resistor row 9 may be a single elongated resistor, whereby there are several successive elongated resistors in a row in the heating resistor row. In the accompanying drawings 1 and 2, the parts 10 in the heating resistor row 9 are for the sake of clarity shown as one elongated part. A single part 10, however, typically consists of several adjacent and separate resistor rods, whereby air can flow between them, at the same time effectively heating the air.

The blowing channel 5 has, in its top part, a channel feed part 11. The channel feed part 11 is wider at its forward end, that is, at the end of the feeding channel 6, and it becomes narrower towards the end in the direction of the flow. This way, air can be fed evenly along the entire length of the blowing channel. On the bottom surface of the channel feed part 11 there is a perforated plate 12 through which air flows to the blow part 13 of the blowing channel 5. The blow part 13 includes said heating resistor row 9. At the end of each of the separately-controllable parts 10 there is a piece 14, typically of a ceramic. The piece 14 is platelike, which may also be called a plate, and divides the blow part 13 into compartments according to the separately-controllable parts 10. This way, the temperature profiling can be accomplished in a precise and controlled manner. In particular, the solution enables convection blowing to be of exactly the desired force and, in particular, of the desired temperature, when directed at the glass sheet 4. The blow part 13 may also be divided into compartments in some other way. On the bottom surface of the blowing channel 5, there is a nozzle plate 15. The nozzle plate 15 may be a perforated plate, in other words one having holes through which air can flow towards the glass sheet 4.

Advantageously the quantity of the parts 10 separately controllable in the heating resistor row 9 is at least ten. There may be a temperature sensor 31 in connection with each of the separately-controllable parts 10. Therefore a tempering furnace may even have hundreds of temperature sensors 31.

In the solution put forth, the heating profile may be defined in a precise manner. The heating profile may be set as desired also for several different successive and/or adjacent glass sheets 4.

In the bottom part of the tempering furnace 1, there is the bottom side blowing channel 16. Air is fed to the bottom side blowing channel 16 through the feeding channel 17 on the bottom side. Air is fed to the blowing channel 7 on the bottom side with a blower 18. The air is circulated back to the blower 18 from the bottom part 4 of the tempering furnace 1 through a return channel 19.

The tempering furnace 1 further has heating resistor rows 20 in its bottom part whereby each heating resistor row 20 comprises separately controllable parts 21. The heating resistor rows 20 and the separately controllable parts 21 of the heating resistor row arranged on the bottom side correspond to the top heating resistor rows 9 and the separately controllable parts 10 of the heating resistor row, described in the above.

The bottom side blowing channel 16 has a feed part 22, perforated plate 23, and blow part 24. As regards their structure and operation, the feed part 22, perforated plate 23 and blow part 24 of the blowing channel 16 on the bottom side correspond to the feed part 11, perforated plate 12, and blow part 13 of the blowing channel 5 on the top side.

At the end of the separately controllable parts 21 there are pieces 25, typically of a ceramic. The pieces 25 correspond to the pieces 14 described in the above.

The warm or hot air is blown from the blow part 24 towards the rolls 3 and the bottom surface of the glass sheets 4 by nozzles 26. The nozzles 26 may be elongated, tubular channels. With such elongated nozzles, the air flow can be effectively and precisely made to reach the desired place, even from a somewhat longer blowing distance.

FIG. 1 additionally shows a schematic representation of a control unit 27. The control unit 27 is used to control the various devices of the tempering furnace 1, such as the blowers 7 and 18, and the conveyor, as well as other similar parts. However, most of the controllable items are not illustrated in FIG. 1 for reasons of clarity. Also, for the sake of clarity, FIG. 1 does now illustrate how the temperature sensors 31 are connected to the control unit 27. Instead, FIG. 1 illustrates, by reference number 28, how the control unit 27 is used to adjust the separately controllable parts 10 and 21 in the heating resistor rows 9 and 20. The accompanying drawings do not show the mountings, cablings, and similar items of the heating resistor rows 9 and 20 for reasons of clarity.

By separately adjusting the separately controllable parts 10 and 21 in the heating resistor rows 9 and 20, the temperature profile of the glass sheet 4 may easily and effectively be adjusted in the transverse direction in relation to its direction of travel. In particular when the heating resistor rows 9 and 20 are arranged in the blowing channels 5 and 16 they can effectively be used to adjust the temperature of the air blown onto the glass sheet 4. When the blowing channels 5 are substantially transverse in relation to the direction of travel of the glass sheets, there will be no longitudinal discontinuity spots forming on the glass sheet in its direction of travel, but the temperature can be kept even in the transverse direction.

Figure 2:
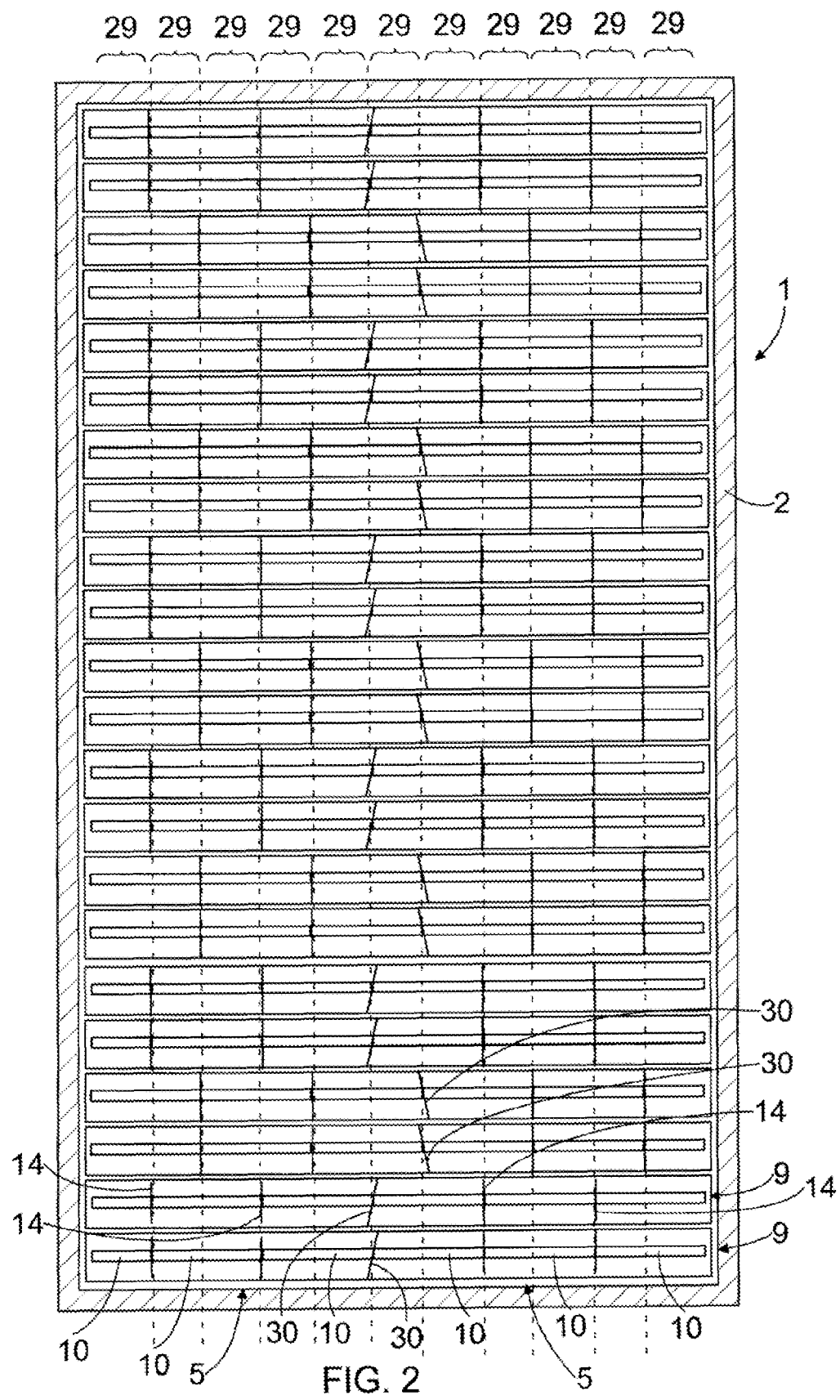
FIG. 2 is a schematic cross-sectional top view of the tempering furnace of FIG. 1 cut along line A-A of FIG. 1.

As illustrated in FIG. 2, subsequent heating resistor rows 9 in the direction of travel of the glass sheets 4 may be so arranged that their separately controllable parts are arranged in such a manner that their forward ends and tail ends are at different locations. The embodiment of FIG. 2 has two successive heating resistor rows 9 arranged in such a way that the forward ends and tail ends of their separately adjustable parts are at the same location, and after that there are again two successive heating resistor rows with the forward ends and tail ends of their separately adjustable parts at a different location with respect to the previous ones, etc.

By interleaving the separately adjustable parts 10, such a feature is established that the transverse temperature profile of the glass sheet 4 can be adjusted more precisely than what the quantity of the separately controllable parts 10 in the resistor row 9 is. If the heating resistor row 9 is divided into six separately controllable parts 10, the tempering furnace will in such a case have six adjacent adjustment areas of the transverse profile, if the separately controllable parts 10 are located in precise succession in the direction of travel of the glass sheets 4. If interleaving is used instead, as illustrated in FIG. 2, the transverse profile can be adjusted in eleven separate zones as illustrated by the reference number 29 in FIG. 2. Therefore the adjustment of the transverse profile can be made most accurate in a simple manner.

In the longitudinal direction of the glass sheets 4, the temperature profile may naturally be adjusted in the direction of travel of the glass sheets 4 by adjusting the heating power of the successive heating resistor rows, or to be more precise, that of their separately controllable parts 10. In addition to adjusting the resistors, the blowing force may be adjusted. The blowing force may be adjusted by using an inverter, for example, to adjust the blower and thus the flow rate that the blower produces. When the blowing force is adjusted, several blowers 7 are arranged one after the other in the longitudinal direction of the tempering furnace 1, making it possible to adjust the temperature longitudinal profile, as regards the blowing force, at as many places as there are blowers 7 arranged in the tempering furnace.

If the blowing channels 5 are divided into at least two parts, as shown in FIG. 1, for example, also the transverse temperature profile may be adjusted by adjusting the blowing force, if the tempering furnace 1, for example, is provided with two separate blowers 7, one feeding air to the right-hand-side blowing channels 5, and the other to the left-hand-side blowing channels 5.

FIG. 2 shows an embodiment where the opposing ends 30 in the blowing channels 5 are shaped oblique. The fact that the ends 30 of the blowing channels are shaped oblique means that the direction of the end 30 differs from the direction of travel of the glass sheets 4 by at least 5 degrees.

According to an embodiment, the obliqueness of the end 30 is at least 10 degrees, for example. According to another embodiment, the obliqueness of the end is 20-55 degrees.

When the opposing ends 30 of the blowing channels 5 are formed oblique, there will be no temperature difference in the glass sheet 4 at the ends. This is due to the fact that the glass sheets 4 are moved during heating, and because the opposing ends 30 of the blowing channels 5 are oblique in relation to the direction of travel of the glass sheets 4, the discontinuity location of blowing at the ends 30 will not affect any one place on the glass sheet for an extended period of time.

FIG. 2 additionally shows an embodiment where the channel parts inside the blowing channels 5 of the tempering furnace 1 are of different length, whereby the ends of two subsequent blowing channels 5 are not at the same location, at least not in every location in the transverse direction of the glass sheets 4. In the embodiment of FIG. 2, two subsequent blowing channels 5 in the direction of travel of the glass sheets 4 are formed in such a manner that their ends are at the same location in the transverse direction of the glass sheets, and after that there are two blowing channels 5 with their ends at different locations in the transverse direction of the glass sheet, in relation to the previous two blowing channels. This type of interleaving of the location of the ends of the blowing channels is also used to avoid the forming of any discontinuity spots in the blowing, and consequently unevenly heated spots on the glass sheet surface. The interleaving of the ends 30 may be applied together with the obliqueness of the ends 30, as shown in FIG. 2. The interleaving of the ends 30 may also be applied when the ends 30 are straight.

As regards the manufacturing technology, all the blowing channels 5 may be made the same length, but arranged at different depths inside the tempering furnace 1, resulting in that their lengths inside the tempering furnace 1 are different, but from the point of view of manufacturing it is simple and easy to make the blowing channels.

FIG. 1 shows that the blowing channel 5 on the top side is divided into two parts whereas the blowing channel 16 on the bottom side is one-piece. The blowing channel on the top side may, however, be one-piece, if so desired, as the blowing channel 16 on the bottom side in FIG. 1. On the other hand, also the blowing channel 16 on the bottom side may be formed two-piece, as shown for the blowing channel 5 in FIG. 1. The end of a one-piece blowing channel need not be oblique.

In connection with FIG. 1, it is put forth that the transverse profile of the glass sheet temperature is adjusted both from above and below of the glass sheet. If desired, the transverse profile of the glass sheet temperature may be adjusted only from above or from below. If the transverse profile of the glass sheet temperature is only adjusted from the top of the glass sheet, for example, the heating means under the glass sheet may be formed simpler than what is described in the drawings. In such a case, the heating resistors do not necessarily need separately controllable parts, for example, but the heating resistor may be substantially of the length of the transverse direction of the tempering furnace. Furthermore, both the heating resistors and blowing channels are not necessarily required on both sides of the glass sheets, but heating may be implemented by utilizing either of the heating methods, only.

Further, oblique ends 30 of the blowing channels and/or interleaving of the blowing channels by forming the channel parts of the blowing channels inside the tempering furnace to be of different lengths may also be applied to such solutions where the heating resistor rows have no separately controllable parts at all and/or where the heating resistor rows are not arranged substantially transverse in relation to the direction of travel of the glass sheets and/or where there are no heating resistor rows at all.

FIG. 1 shows that the heating resistor rows are arranged inside the blowing channels to heat the air being blown. However, the heating resistors may also be arranged outside of the blowing channels. In the embodiment of FIGS. 1 and 2, there is a small gap between successive blowing channels in the direction of travel of the glass sheets, but if the heating resistors are arranged further from the glass sheet being heated than the blowing channels, for example, a wider gap than the one shown in FIG. 2 needs to be left between the blowing channels so that the radiation from the resistors effectively heats the glass sheets.

Figure 3:
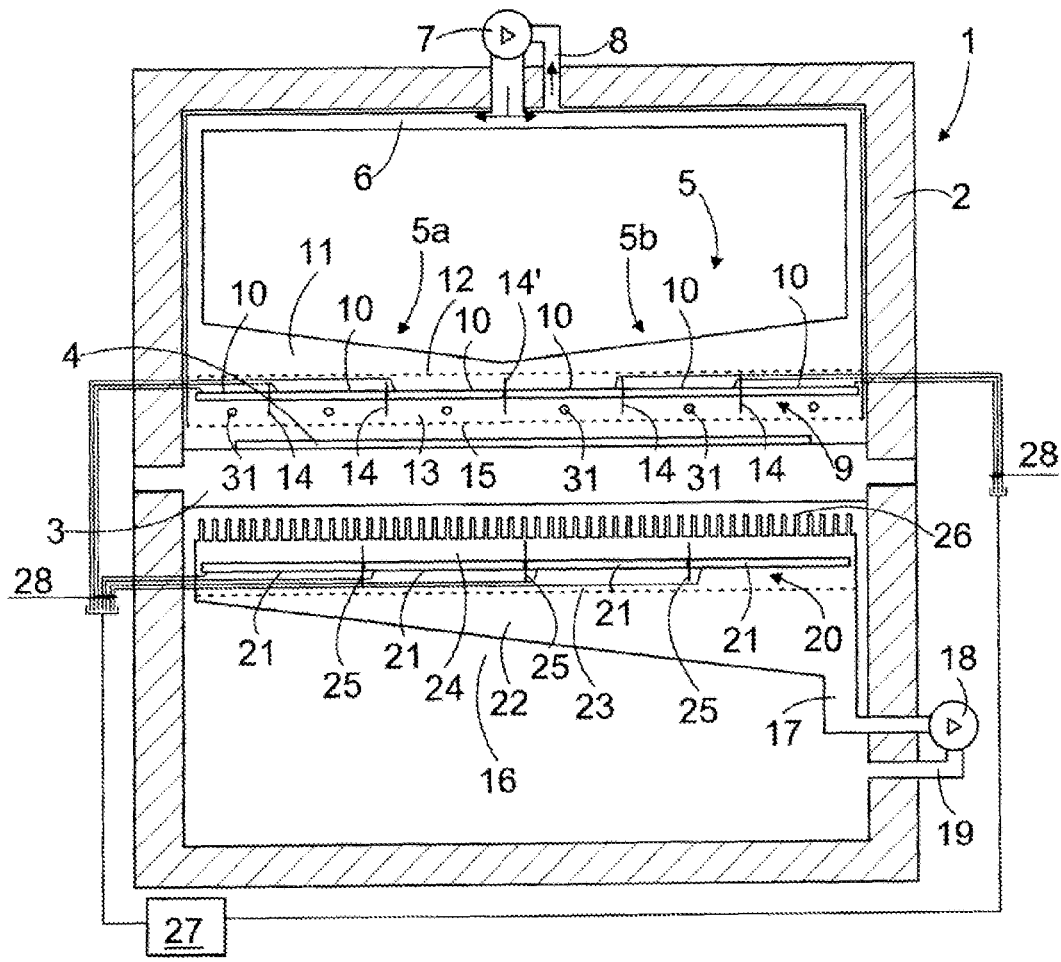
FIG. 3 is a schematic cross-sectional view of a second tempering furnace as seen from the direction of travel of the glass sheets.

FIG. 3 is a schematic cross-sectional end-view representation a second glass tempering furnace 1. The structure of the tempering furnace 1 of FIG. 3 corresponds to the structure of the tempering furnace 1 of FIG. 1 in other respects, but differs as concerns the blowing channels 5 in the top part of the tempering furnace 1. In FIG. 3, each blowing channel 5 is uniform, but comprise pieces 14, 14' that divide the blowing channel 5 in its bottom part, that is as seen in the vertical direction, into several blowing channel parts at the blow part 13 of the blowing channel 5. The heating air is fed into the blowing channel 5 through a feeding channel 6. The feeding channel 6 connects to the blowing channel 5 in the substantially transverse direction in relation to the direction of travel of the glass sheet 4, in connection with the opposite ends of the blowing channel 5, located on the sides of the tempering furnace 1, whereby the heating air is blown on the surface of the glass sheet 4 through the blowing channel 5 in the substantially transverse direction in relation to the direction of travel of the glass sheet 4 as separate heating air streams from the direction of the opposite edges of the glass sheet 4.

Whereas in FIG. 1 the blowing channel 5 consists of two separate blowing channel parts, in the embodiment of FIG. 3 there is, on the center section of the blowing channel 5, a piece 14 which divides the blowing channel 5 into two blowing channel parts 5a and 5b into which heating air is fed in the substantially transverse direction in relation to the direction of travel of the glass sheet 4 as separate heating air streams from the direction of the opposite edges of the glass sheet. So, the glass tempering furnace 1 of FIG. 3 has a uniform blowing channel 5 in the substantially transverse direction in relation to the direction of travel of the glass sheet 4, which is divided in the bottom part by at least one piece 14' into at least two blowing channel parts 5a, 5b whereas FIG. 1 shows a blowing channel 5 consisting of two separate blowing channel parts. The piece 14' on the center portion of the blowing channel 5 in two successive blowing channels 5 in the direction of travel of the glass sheet 4 is positioned in different locations in the transverse direction in relation to the direction of travel of the glass sheet 4, whereby it is possible to avoid any discontinuity spots from forming in the blowing and thus spots that are unevenly heated on the surface of the glass sheet.

It is obvious for a person skilled in the art that as the technology advances the basic idea of the invention may be implemented in various ways. The invention and its embodiments are thus not restricted to the above-described examples but may vary within the scope of the claims.

The invention claimed is:

1. A method for heating glass sheets, the method comprising:
    feeding a glass sheet through a tempering furnace in which the glass sheet is heated both from above and below, wherein:
    the glass sheet is heated by means of a plurality of blowing channels, the longitudinal axes of which are arranged in the substantially transverse direction in relation to the direction of travel of the glass sheet and by means of heating resistor rows arranged in the substantially transverse direction in relation to the direction of travel of the glass sheet, wherein the plurality of blowing channels are positioned sequentially adjacent to each other in the direction of travel of the glass sheet,
    the heating resistor rows having at least three separately controllable parts,
    the heating resistor rows being arranged in the plurality of blowing channels to heat the air being blown,
    the plurality of blowing channels comprising a blow part that includes the heating resistor rows,
    the plurality of blowing channels being divided into compartments according to the separately controllable parts, such that the plurality of blowing channels are aligned with the at least three separately controllable parts, and such that the plurality of blowing channels are configured to blow heated air onto the glass sheet,
    the temperature profile of the glass sheet is adjusted in the transverse direction by separately adjusting the different parts of the heating resistor row, and
    the heating means further comprises an air feeding channel configured for supplying air to each of the compartments.

2. The method according to claim 1, wherein the quantity of the parts separately controllable in a heating resistor row is at least ten.

3. The method according to claim 1, wherein the parts of at least two successive heating resistor rows in the direction of travel of the glass sheet are at least partly divided into parts at different locations, whereby the temperature profile of the glass sheet is adjusted to have more heating zones in the transverse direction than the quantity of the separately controllable parts in a heating resistor row.

4. The method according to claim 1, wherein the transverse profile of the glass sheet temperature is adjusted at least from the top of the glass sheet.

5. The method according to claim 1, wherein the blowing channel is comprised of two separate parts.

6. The method according to claim 5, wherein the ends of the opposing parts in the blowing channels are shaped oblique.

7. The method according to claim 5, wherein the channel parts inside the tempering furnace of at least two successive blowing channels in the direction of travel of the glass sheet are of different length whereby their ends are at different locations in the transverse direction of the glass sheet.

8. The method according to claim 6, wherein the channel parts inside the tempering furnace of at least two successive blowing channels in the direction of travel of the glass sheet are of different length whereby their ends are at different locations in the transverse direction of the glass sheet.

9. A glass tempering furnace for heating glass sheets, the glass tempering furnace having means for heating the glass sheets from above and below, and a conveyor configured to convey the glass sheets through the glass tempering furnace, wherein:
    the heating means comprise a plurality of blowing channels, the longitudinal axes of which are arranged in the substantially transverse direction in relation to the direction of travel of the glass sheets and heating resistor rows arranged in the substantially transverse direction in relation to the direction of travel of the glass sheets, wherein the plurality of blowing channels are positioned sequentially adjacent to each other in the direction of travel of the glass sheets,
    the heating resistor row has at least three separately controllable parts,
    the heating resistor rows being arranged in the plurality of blowing channels to heat the air being blown,
    the plurality of blowing channels comprising a blow part that includes the heating resistor rows,
    the plurality of blowing channels having platelike pieces to divide the blowing channel into compartments according to the separately controllable parts, such that the plurality of blowing channels are aligned with the at least three separately controllable parts, and such that the plurality of blowing channels is configured to blow heated air onto the glass sheets, and
    the heating means further comprises an air feeding channel configured for supplying air to each of the compartments.

10. The glass tempering furnace according to claim 9, wherein the separately controllable parts of at least two successive heating resistor rows in the direction of travel of the glass sheets are arranged in such a manner that their forward ends and tail ends are at different locations.

11. The glass tempering furnace according to claim 9, wherein the transverse blowing channels are formed of at least two separate parts.

12. The glass tempering furnace according to claim 11, wherein the ends of the opposing parts in the blowing channels are shaped oblique.

13. The glass tempering furnace according to claim 11, wherein the channel parts inside the glass tempering furnace of at least two successive blowing channels in the direction of travel of the glass sheets are of different length whereby their ends are at different locations in the transverse direction of the glass sheets.

14. The glass tempering furnace according to claim 12, wherein the channel parts inside the glass tempering furnace of at least two successive blowing channels in the direction of travel of the glass sheets are of different length whereby their ends are at different locations in the transverse direction of the glass sheets.

15. A method for heating glass sheets, the method comprising:
    feeding a glass sheet through a tempering furnace in which the glass sheet is heated both from above and below, wherein:
    the glass sheet is heated by means of blowing channels, the longitudinal axes of which are arranged in the substantially transverse direction in relation to the direction of travel of the glass sheet and by means of heating resistor rows arranged in the substantially transverse direction in relation to the direction of travel of the glass sheet, the heating resistor rows having at least three separately controllable parts, the heating resistor rows being arranged in the blowing channels to heat the air being blown, the blowing channels being divided into compartments according to the separately controllable parts, such that the blowing channels are aligned with the at least three separately controllable parts, the temperature profile of the glass sheet is adjusted in the transverse direction by separately adjusting the different parts of the heating resistor row, the heating means further comprises an air feeding channel configured for supplying air to each of the compartments, and the blowing channels include a channel feed part, the channel feed part having a tapered shape as viewed in the transverse direction in relation to the direction of travel of the glass sheets.

16. A glass tempering furnace for heating glass sheets, the glass tempering furnace having means for heating the glass sheets from above and below, and a conveyor configured to convey the glass sheets through the glass tempering furnace, wherein:

the heating means comprise blowing channels, the longitudinal axes of which are arranged in the substantially transverse direction in relation to the direction of travel of the glass sheets and heating resistor rows arranged in the substantially transverse direction in relation to the direction of travel of the glass sheets, the heating resistor row has at least three separately controllable parts, the heating resistor rows being arranged in the blowing channels to heat the air being blown, the blowing channels having platelike pieces to divide the blowing channel into compartments according to the separately controllable parts, such that the blowing channels are aligned with the at least three separately controllable parts, the heating means further comprises an air feeding channel configured for supplying air to each of the compartments, and the blowing channels include a channel feed part, the channel feed part having a tapered shape as viewed in the transverse direction in relation to the direction of travel of the glass sheets.

* * * * *